(12) United States Patent
Clifton et al.

(10) Patent No.: US 9,424,280 B2
(45) Date of Patent: Aug. 23, 2016

(54) ORGANIZING MEDIA ITEMS BASED ON METADATA SIMILARITIES

(71) Applicant: Animoto, Inc., San Francisco, CA (US)

(72) Inventors: Tom Clifton, Brooklyn, NY (US); Christopher James Maddern, Sunnyside, NY (US); Faisal Riaz Anwar, New York, NY (US); Josh Lambert, Brooklyn, NY (US); Gordon Mei, Brooklyn, NY (US)

(73) Assignee: Animoto Inc., San Francisco, CA (US)

( * ) Notice: Subject to any disclaimer, the term of this patent is extended or adjusted under 35 U.S.C. 154(b) by 329 days.

(21) Appl. No.: 14/135,399

(22) Filed: Dec. 19, 2013

(65) Prior Publication Data

US 2014/0188890 A1    Jul. 3, 2014

Related U.S. Application Data

(60) Provisional application No. 61/746,852, filed on Dec. 28, 2012.

(51) Int. Cl.
*G06F 17/30* (2006.01)

(52) U.S. Cl.
CPC ...... *G06F 17/3028* (2013.01); *G06F 17/30265* (2013.01); *G06F 17/30268* (2013.01); *G06F 17/30056* (2013.01)

(58) Field of Classification Search
CPC ............. G06F 17/30265; G06F 17/30056; G06F 17/30247; G06F 17/30973; G06F 17/30268
See application file for complete search history.

(56) References Cited

U.S. PATENT DOCUMENTS

| 7,779,358 B1* | 8/2010 | Gupta | G06F 17/30274 715/730 |
| 8,983,138 B2* | 3/2015 | Miyashita | G06F 17/30265 348/231.2 |
| 2007/0124325 A1 | 5/2007 | Moore et al. | |
| 2007/0236729 A1* | 10/2007 | Yoda | G06F 17/30247 358/1.15 |
| 2010/0278396 A1* | 11/2010 | Mitsuhashi | G06F 17/30247 382/118 |
| 2011/0052073 A1* | 3/2011 | Wallace | G06K 9/00704 382/190 |

(Continued)

OTHER PUBLICATIONS

Snavely et al., "Photo Tourism: Exploring Photo Collections in 3D", dated 2006, 12 pages.

(Continued)

*Primary Examiner* — Merilyn Nguyen
(74) *Attorney, Agent, or Firm* — Hickman Palermo Becker Bingham LLP; Adam C. Stone

(57) ABSTRACT

A media item selection application is provided for use with computing devices. The media item selection application is configured to identify media items that have significant similarities in metadata values, such as location and time period. The media item selection application is further configured to visualize similar media items as a group, depicted as a section within a collection or gallery, in which each group is a suggestion for a natural collection of media items representing an event. Where media items do not fall within a group of a particular size with significant similarities, groups are consolidated to create a second type of collection which covers a time-period between two significant groups. Further, the media item selection application is configured to depict media items that show extraordinary similarity as a virtual stack of all such media items.

27 Claims, 14 Drawing Sheets

(56) References Cited

U.S. PATENT DOCUMENTS

| | | | | |
|---|---|---|---|---|
| 2011/0115943 | A1* | 5/2011 | Sassa | G06F 17/30247 348/231.5 |
| 2011/0205399 | A1* | 8/2011 | Gao | G06F 17/30056 348/231.99 |
| 2012/0027256 | A1* | 2/2012 | Kiyohara | G06F 17/30029 382/103 |
| 2012/0233000 | A1* | 9/2012 | Fisher | G06Q 30/02 705/14.71 |
| 2012/0328190 | A1* | 12/2012 | Bercovich | G06F 17/30268 382/165 |

OTHER PUBLICATIONS

Simon et al., "Scene Summarization for Online Image Collections", ICCV dated 2007, 8 pages.

Jang et al., "Smart Management System for Digital Photographs using Temporal and Spatial Features with EXIF metadata", IEEE, dated 2007, 6 pages.

Cao et al., "Annotating Photo Collections by Label Propagation According to Multiple Similarity Cues", dated Oct. 26, 2008, 9 pages.

\* cited by examiner

Picker-Workspace Top Navigation with Existing Workspace

Fig. 5
Picker-Workspace Top Navigation with Future Workspace
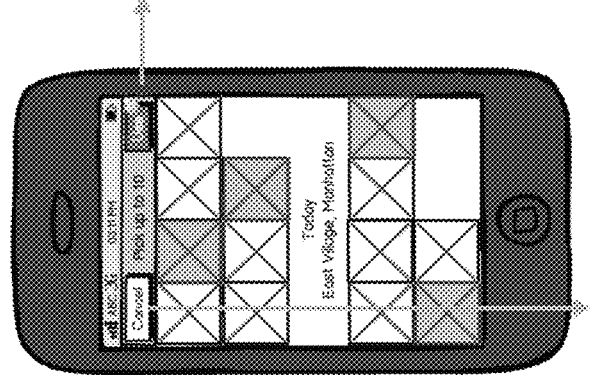
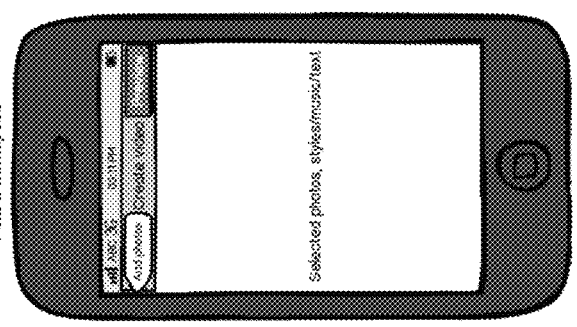

Fig. 8

Photo stacks

 Start in unselected state.

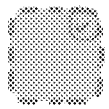 Tap on checkmark, selects single photo from stack (the last one).

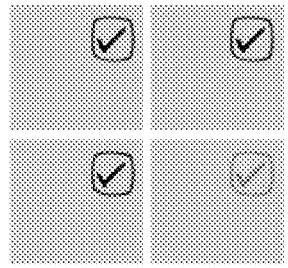 Tap on stack, zooms in, selected photos show with green checkmarks.

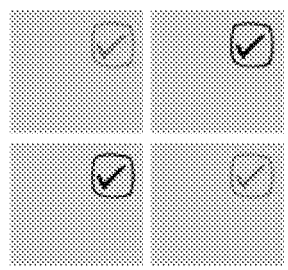 Select another photo from stack.

 Tap outside of stack to zoom out. Green number shows number selected from stack.

 Tap on checkmark, deselects all photos from stack, returns to grey.

 Tap on checkmark, selects last photo from stack, forgets what user previously selected.

ORGANIZING MEDIA ITEMS BASED ON METADATA SIMILARITIES

PRIORITY CLAIM

This application claims the benefit of Provisional Appln. 61/746,852, filed Dec. 28, 2012, the entire contents of which is hereby incorporated by reference as if fully set forth herein, under 35 U.S.C. §119(e).

TECHNICAL FIELD

The present disclosure relates to organizing digital media items based on data relating to the media items. The disclosure relates more specifically to organizational techniques for digital media items as applied to graphical user interfaces of computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital photography has become ubiquitous among users of mobile computing devices. Because taking digital media items is easy using a digital camera or the camera integrated into mobile computing devices such as smartphones and tablet computers, users rapidly create collections or galleries containing large numbers of media items. However, organizing the media items and selecting media items appropriate for use in other applications remains challenging.

For example, in some cases users may take and store multiple similar media items of a particular subject; later, when the user desires to select one representative media item for use in another application, the user is required to review each of the multiple similar media items and select one. As another example, a user may take a large number of media items over a period of many days; thereafter, it may be difficult for the user to remember which media items were taken on which day, for the purpose of facilitating the creation of albums, making videos or using other applications. The same issues summarized above may exist for collections of media items of other kinds, such as videos.

BRIEF DESCRIPTION OF DRAWINGS

In the drawings:

FIG. 5 illustrates, in wireframe views with legends and notes, one example embodiment of two (2) successive user interfaces that may be used in connection with the processes herein in a video authoring app.

FIG. 8 illustrates example tiles, icons and other elements that may be used in a graphical user interface according to an embodiment to indicate various kinds of states for stacks of media items.

Figure 1:
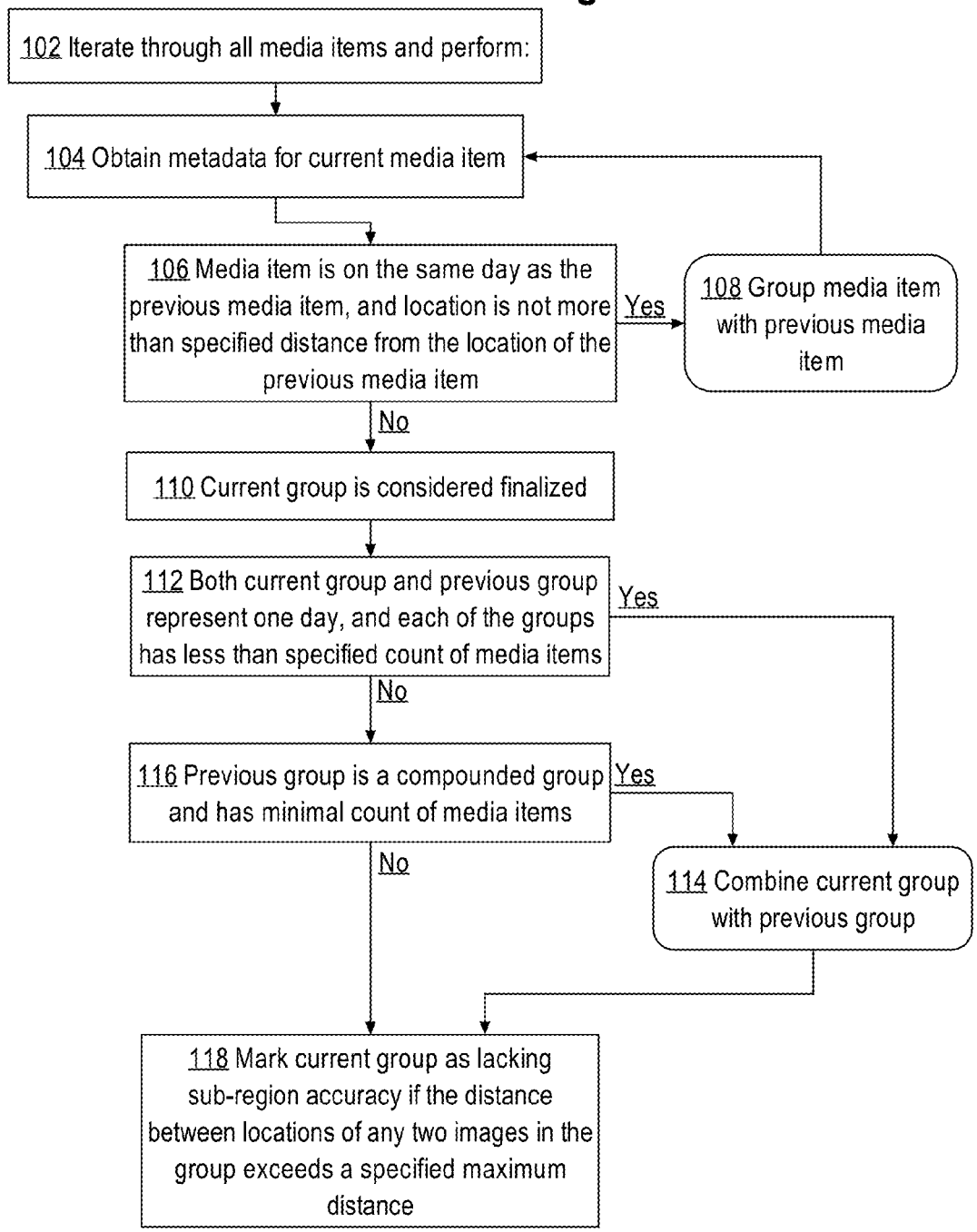
FIG. 1 illustrates a process of organizing media items in groups that may be displayed in sections.

All text shown in any of the drawing figures constitutes a part of the complete disclosure of embodiments herein and is hereby incorporated by reference for all purposes as if fully set forth herein.

SUMMARY OF INVENTION

The appended claims may serve as a summary of the invention.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Functional Overview

In one embodiment, a media item selection application, which may be informally termed a media item picker or photo picker in some embodiments, is provided for use with computing devices. Examples of computing devices with which embodiments may be used include smartphones, tablet computers, digital cameras, personal computers, and other computing devices that process, manage, or use digital media items. The term "media items" is used herein to refer to digital images or photos, digital videos, digital audio files, and any other item of audiovisual media that may be represented in computer storage.

In one embodiment, the media item selection application is configured to identify media items that have significant similarities in metadata values, such as location and time period. The media item selection application is further configured to visualize similar media items as a group, depicted as a section within a collection or gallery, in which each group is a suggestion for a natural collection of media items representing an event. Where media items do not fall within a group of a particular size with significant similarities, groups are consolidated to create a second type of collection which covers a time-period between two significant groups.

Further, in an embodiment, the media item selection application is configured to depict media items that show extraordinary similarity as a virtual stack of all such media items. A virtual stack occupies a single media item position or tile in a collection or gallery. In this context, media items with extraordinary similarity are those media items that the media item selection application determines to represent the same subject in multiple shots. In an embodiment, the media item selection application is configured to detect a selection of a stack of media items and, in response to the selection, to visually expand the stack by displaying all media items that are contained within the stack. Consequently, a user can obtain an overview of the media items for an event, without having to view all substantially duplicate media items, and without having all media items for an event occupy excessive space in the display screen or user interface of the computing device.

FIG. 1 illustrates a process of organizing media items in groups that may be displayed in sections. In one embodiment, media items are grouped based upon metadata values stored with the media items. The metadata values typically are created and stored as part of a media item at the time that the media item is originally formed, by the computing device or digital camera that originally formed the media item. In one embodiment, media items are grouped based on timestamp and geo-location attributes; other embodiments may be configured to group media items based on any other metadata values of media items that are useful in grouping.

As indicated at 102, in an embodiment, to accomplish grouping, the process iterates through all media items of a set of media items. The set of media items may comprise a gallery, collection, user selection of a subset of media items, media items in a folder, directory, filesystem, or other location. Media items may be obtained from local storage in a computing device, from local network resources such as local storage, or from remote network sources such as cloud-based storage or third party media item hosting services. In general, the process of FIG. 1 can be applied to any set of media items.

At 104, metadata for the current media item is obtained. The metadata is used in subsequent operations to determine how to accomplish groupings.

At 106, based on values of the metadata, the process tests whether the media item was taken on the same day as the previous media item, as indicated by the timestamp metadata value, and the location of the media item as indicated by geo-location metadata values is not more than a specified distance from the location of either the previous media item, or the last media item in the previous group if the previous media item is contained within a group. In an embodiment, the specified distance may be 5,000 meters, but in other embodiments, other distance values may be used.

If the conditions at 106 are true, then at 108, the current media item is grouped with the previous media item.

If the conditions at 106 are not true, then the current media item does not belong in the current group, and therefore the current group is considered finalized at 110. The process then determines whether to combine or compound the current group with the previous group.

In an embodiment, a group should be compounded with the previous group when the following conditions are met.

1. Both the current group and previous group represent one day and each have less than a specified count of media items, as shown at 112. In an embodiment, the specified count of media items is six (6) media items, but in other embodiments, other values may be used for the specified count.

2. Alternatively, as shown at 116, compounding may be performed when the previous group is already a compounded group and has a minimal count of media items. In one embodiment, the minimal count of media items exists when the count of media items in the group is:

$$\min\left(\frac{\text{items in previous group}}{\text{TUNING\_CONV} * \text{days in previous group}}, \text{items in previous group}\right) < \text{TUNING\_ITEM\_COUNT}$$

AND when the current group has less than TUNING_ITEM_COUNT media items. In an embodiment, the value of the constant TUNING_CONV is typically set to a relatively low value, such as two (2); increasing this constant makes it more likely that already multi-day groups will be merged with other groups, thus causing longer multi-day periods). In an embodiment, TUNING_ITEM_COUNT refers to a specified minimum count value. In one embodiment, the value is six (6), but in other embodiments, other values may be used.

If either condition is true, then the current group is combined with the previous group, as shown at 114.

In an embodiment, at 118, a group is marked as not having geo-location values that are sufficient to indicate accuracy to a sub-region, such as a neighborhood, borough, or other geographical sub-unit, if the distance between any two media items is greater than a specified maximum distance value. In one embodiment, the maximum distance value is 1,000 meters, but in other embodiments, different maximum distance values may be used. In one implementation, a group that is marked as not having sub-region accuracy could be indicated, in the graphical user interface of an application program, with a label for a city or other macro-level geographical unit rather than using a label for a neighborhood, borough, or other geographical sub-unit.

In an embodiment, for purposes of determining whether two media items were taken on the same day, the time range 4:00 AM to 3:59 AM is considered to be the same day. For example, an media item having a timestamp of 3:30 AM on 23 Dec. 2012 would be considered as taken on 22 Dec. 2012.

Figure 2:
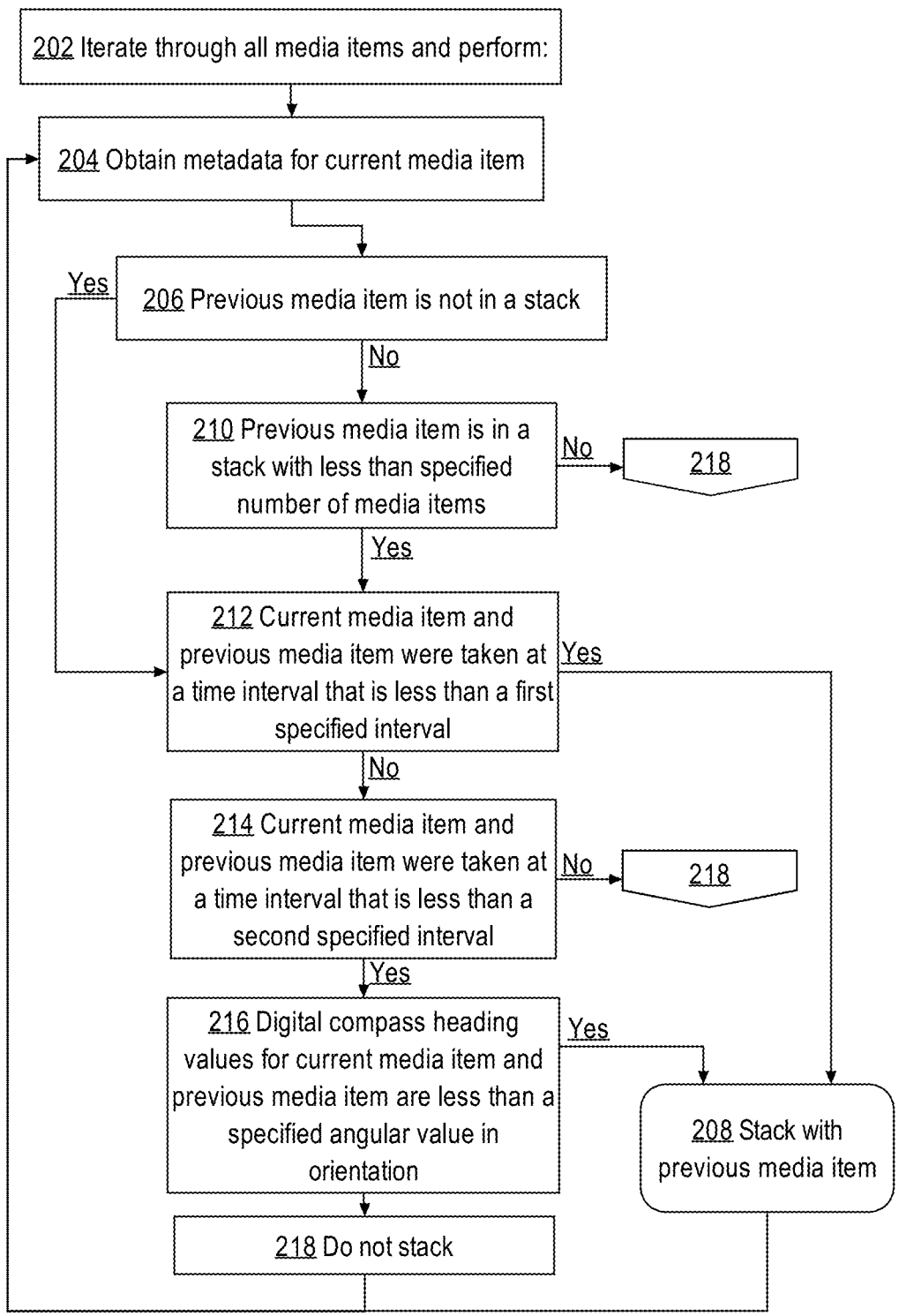
FIG. 2 illustrates a process of stacking similar media items, according to an embodiment.

FIG. 2 illustrates a process of stacking similar media items, according to an embodiment.

In one embodiment, media items are grouped based on the following attributes: Timestamp; Geo-location; Digital compass heading. In other embodiments, other grouping criteria may be used. Further, in an embodiment, media items from multiple locations are not stacked, as the use of the grouping logic of FIG. 1 will have already broken out locations.

As seen at 202, in an embodiment, the process iterates through all media items in a set. At 204, the metadata values for the current media item are obtained. The metadata values used in the process may be obtained from data associated with the media items, or other sources such as the EXIF; for example, the digital compass heading value may be extracted from the EXIF. Thereafter, a media item is stacked with the previous media item if the conditions set forth in operations 206 to 216 are satisfied as indicated in the diagram. In an embodiment, at 206 the process tests whether the previous media item is not in a stack. If so, then control passes to 212, discussed below. Alternatively, if the previous media item is in a stack that has less than a specified number of media items, then control passes to 212. In one embodiment, the specified number is 15, but in other embodiments different values may be used for the maximum number of media items in a stack.

If neither condition of 206, 210 is true, then control passes to 218 and the media item is not placed in a stack, and control returns to 204 to process the next media item.

At 212, the process tests whether a difference between timestamps of the current media item and the previous media item indicates that the media items were taken within a time interval that is less than a first specified interval value. In one embodiment, the first specified interval value is 5 seconds, but in other embodiments, other time interval values may be used. If 212 is true, then control passes to 208 and the current media item is placed in a stack with the previous media item. Placing a media item in a stack may comprise creating, in computer memory or storage, a new stack item which replaces the original media item; the stack item comprises an array of all media items that are in that stack.

If 212 is not true, then at 214, the process tests whether the current media item and the previous media item were taken at a time interval that is less than a second specified time interval. Typically the second specified time interval value is greater than the first specified time interval; as an example, in one embodiment the second specified time interval value is 10 seconds.

If 214 is not true, then control passes to 218 at which the media item is not placed in a stack.

If 214 is true, then at 216, the process tests compares the digital compass heading values for the current media item and the previous media item; if the difference in the values indicates that the media items were taken at less than a specified angular value in orientation, then control passes to 208 at which the current media item is placed in a stack with the previous media item. In one embodiment, the specified angular value is 45 degrees, but in other embodiments, other values may be used.

Using the process of FIG. 2, a large set of media items may be grouped into a reasonable number of stacks, each having a reasonable number of media items that have reasonable relationships in terms of timestamp and angular orientation. As a result, the process improves the efficiency and ease with which a user can perform the task of selecting media items, and also may improve the storage and processing efficiency of a computer that is processing media items by enabling more rapid access to related media items for use in other operations.

Figure 3:
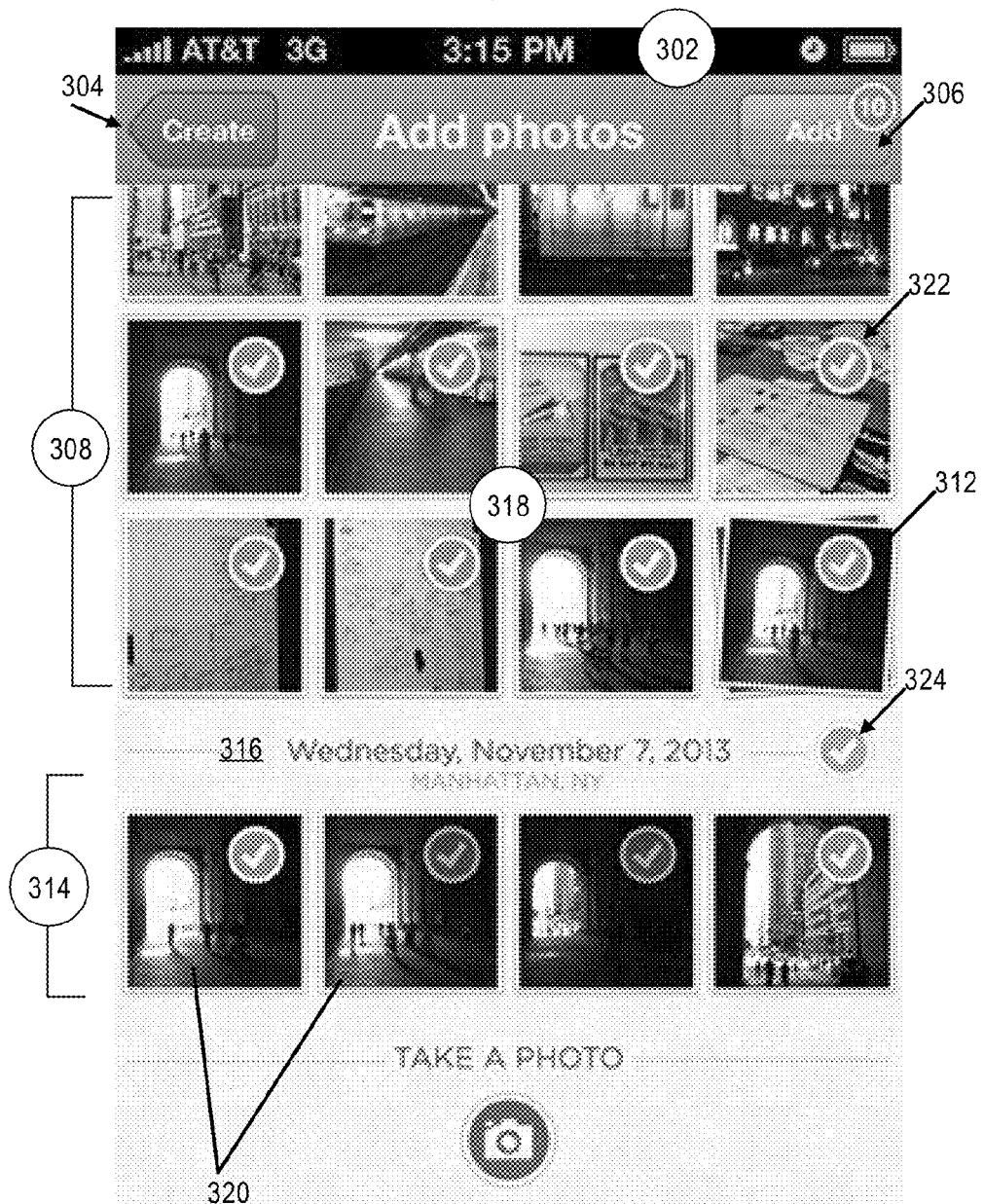
FIG. 3 illustrates an example graphical user interface of a mobile computing device that may be presented after use of the processes of FIG. 1, FIG. 2.

FIG. 3 illustrates an example graphical user interface of a mobile computing device that may be presented after use of the processes of FIG. 1, FIG. 2. In an embodiment, a graphical user interface (GUI) 302 may be displayed during use of an app such as a video authoring app, a media item management app, or any other app in which selecting or picking one or more media items, or stacks of media items, may be useful. In the example of FIG. 3, GUI 302 is provided in a mobile computing device having a touch-sensitive display, but other embodiments may be used with displays and computing devices that use a pointing device, such as a mouse or trackball, to indicate and select items or functions.

In an embodiment, GUI 302 comprises a Create button 304 and an Add button 306 which, when selected by touch input, respectively cause the GUI to return to a create function of the app in which the GUI is used or to transition to an Add function in which selected media items are added to another entity. The Create button 304 and Add button 306 merely serve as examples of buttons or functions for navigating away from the GUI 302 and other embodiments may use different navigation techniques. When used, the Add button 306 may include a numeric value superimposed over the button to indicate the total number of media items that have been selected in GUI 302. In some descriptions herein, the term "badge" is used to refer to values, icons or other indicators that are displayed in association with a GUI element, such as by superimposition on the associated GUI element.

In an embodiment, GUI 302 comprises a first section 308 having a plurality of media items some of which are indicated for example as media items 318 and a second section 314 having a second plurality of media items some of which are indicated for example as media items 320. Section 314 is indicated by a section header 316 that may include a label, such as a timestamp, location, or other data. Two sections 308, 314 are shown to illustrate a clear example, but in a practical embodiment any number of sections may be used. In an embodiment, a section 308, 314 also may comprise one or more stacks of media items; an example stack 312 is shown in the first section 308. In an embodiment, a stack is indicated using a graphical icon that uses an media item thumbnail depicted at an angle with other graphical elements suggesting that another media item is underneath the thumbnail.

In an embodiment, any of the media items 318, 320 or stacks 312 may include a selection icon 322 which, in the example of FIG. 3, is depicted as a check mark. In an embodiment, a selection icon 322, when highlighted or emphasized, indicates that the associated media item or stack has been selected. A non-highlighted, non-emphasized or grayed-out selection icon 322 may indicate that the associated media item or stack is not selected. Selection of a media item or stack, in this example, refers to identifying a media item or stack to be used in another function or entity of the associated app in which GUI 302 is used. For example, selecting or picking media items or stacks may be used to inform a video authoring app that the selected media items are to be incorporated into a music video when the Add button 306, and possibly other functions, is or are invoked.

In an embodiment, section header 316 may further comprise a selection icon 324 that may indicate, in a manner similar to selection icons 322, that the entire section 314 is selected. In an embodiment, selecting a selection icon 324 in a section header 316 causes automatically selecting all media items in the section, resulting in changing the selection icons 322 for all media items in the section to indicate selection. In an embodiment, if the selection icon 324 of a section header 316 does not indicate selection, as shown in FIG. 3, then one or more media items in the section 314 is not selected; however some of the media items in the section may be selected even though the selection icon is not emphasized or highlighted.

A section 308, 314 may include any number of media items and the particular number of media items shown in FIG. 3 merely illustrates one example.

Figure 4:
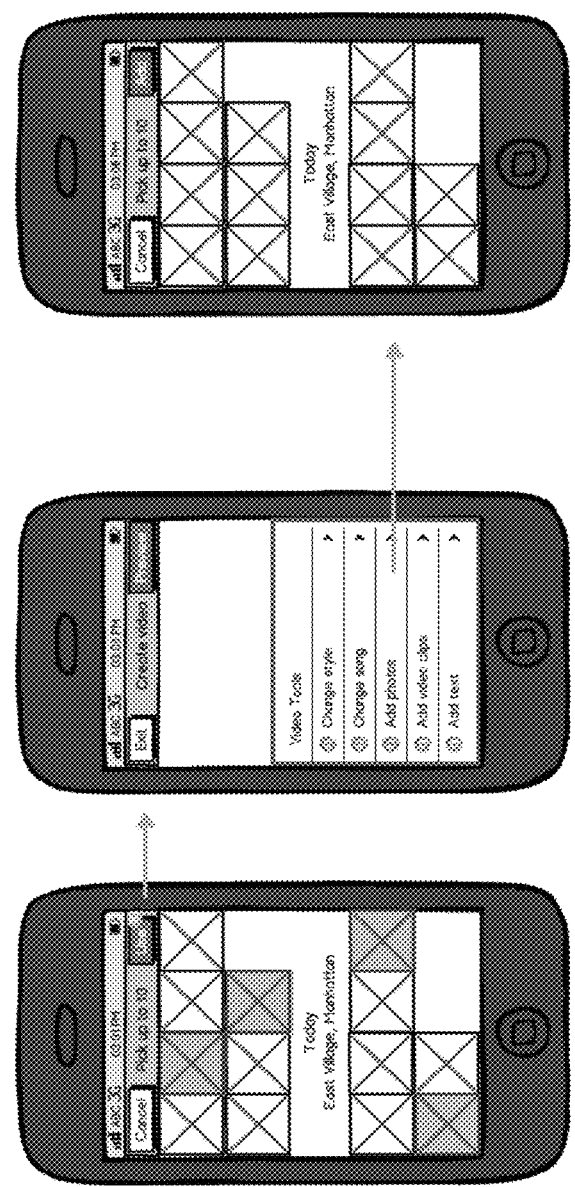
FIG. 4 illustrates, in wireframe views with legends and notes, one example embodiment of three (3) successive user interfaces that may be used in connection with the processes herein in a video authoring app.

FIG. 4 illustrates, in wireframe views with legends and notes, one example embodiment of three (3) successive user interfaces that may be used in connection with the processes herein in a video authoring app. Starter picker wireframe 402 indicates an example GUI that may be used to select a plurality of media items for use in a video. Workspace wireframe 404 indicates an example GUI that may be displayed and used after user selection of a USE button in wireframe 402 to indicate using the selected media items. Editing picker wireframe 406 indicates an example GUI that may be displayed in response to user selection of an Add Media items function in the GUI of wireframe 404.

FIG. 5 illustrates, in wireframe views with legends and notes, one example embodiment of two (2) successive user interfaces that may be used in connection with the processes herein in a video authoring app. Starter picker wireframe 402 indicates an example GUI that may be used to select a plurality of media items for use in a video. Workspace wireframe 502 indicates an example GUI that may be displayed and used after user selection of a USE button in wireframe 402 to indicate using the selected media items.

Figure 6:
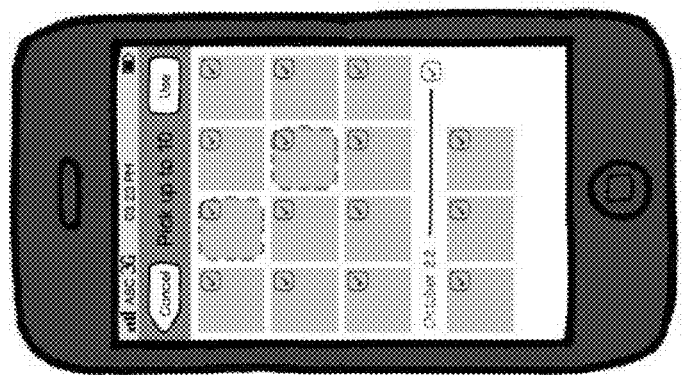
FIG. 6 illustrates, in wireframe views with legends and notes, one example embodiment of a graphical user interface with example state indications, Use button renderings, and section selection indicators.

FIG. 6 illustrates, in wireframe views with legends and notes, one example embodiment of a graphical user interface with example state indications, Use button renderings, and section selection indicators.

Figure 7:
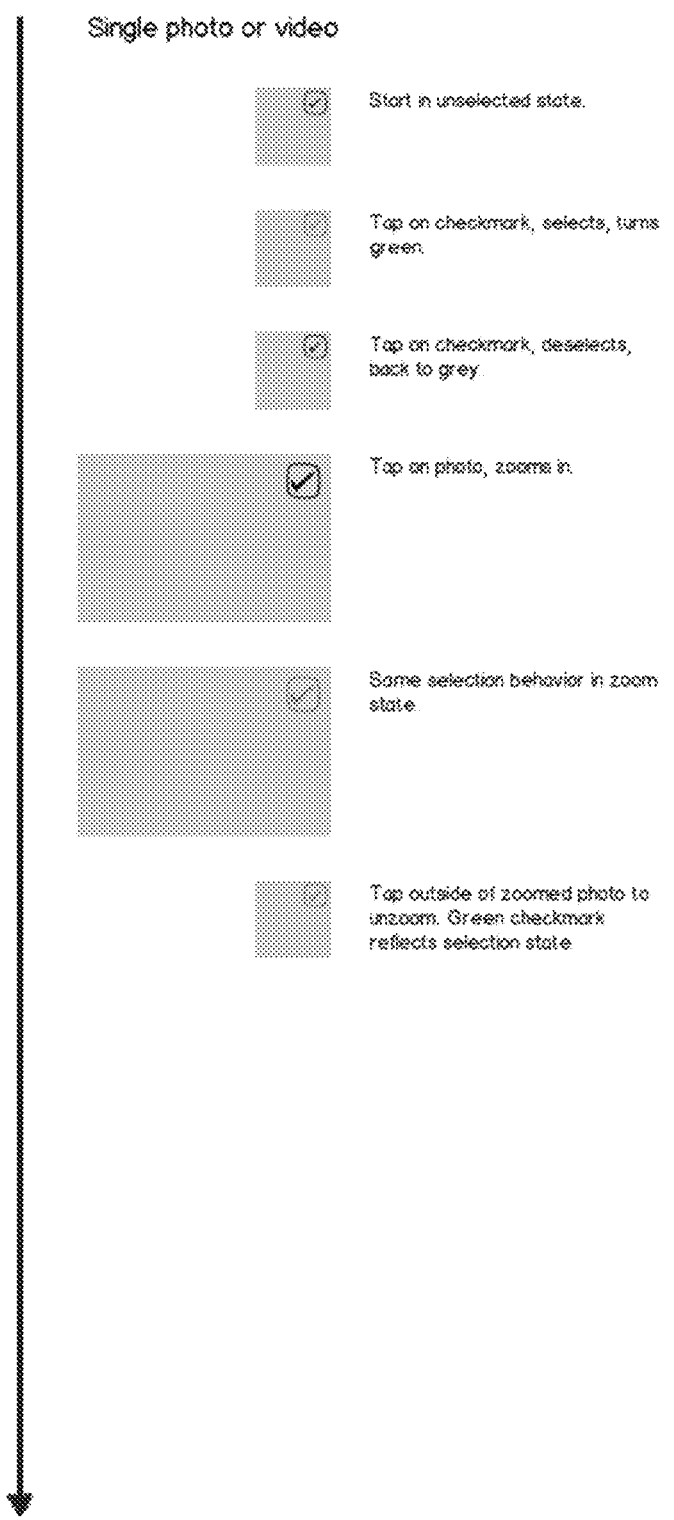
FIG. 7 illustrates example tiles, icons and other elements that may be used in a graphical user interface according to an embodiment to indicate various kinds of states for individual media items.

FIG. 7 illustrates example tiles, icons and other elements that may be used in a graphical user interface according to an embodiment to indicate various kinds of states for individual media items. Example interactions resulting in various kinds of states may include non-selection, selection, zooming, selection of a media item in a zoomed state, and unzoomed.

FIG. 8 illustrates example tiles, icons and other elements that may be used in a graphical user interface according to an embodiment to indicate various kinds of states for stacks of media items. Example interactions resulting in various kinds of states may include non-selection, selecting a top media item of a stack, showing individual media items in a stack with selection indicators, re-displaying individual media items in a stack after a new selection, displaying a stack tile in response to input that selects a region outside or away from the individual media items, and indicating selection of a stack in various ways.

Figure 9:
FIG. 9 illustrates example tiles, icons and other elements that may be used in a graphical user interface according to an embodiment to indicate various kinds of states for sections of media items.

FIG. 9 illustrates example tiles, icons and other elements that may be used in a graphical user interface according to an embodiment to indicate various kinds of states for sections of media items. Example interactions resulting in different states may include non-selection, selecting all media item in a section, unselecting one media item in a section, unselecting all media items in a section, and again selecting an entire section. The example interactions also may occur in an embodiment in which limit values are enforced, as further described below, resulting in displaying notifications or warnings if an applicable limit is exceeded.

Figure 10:
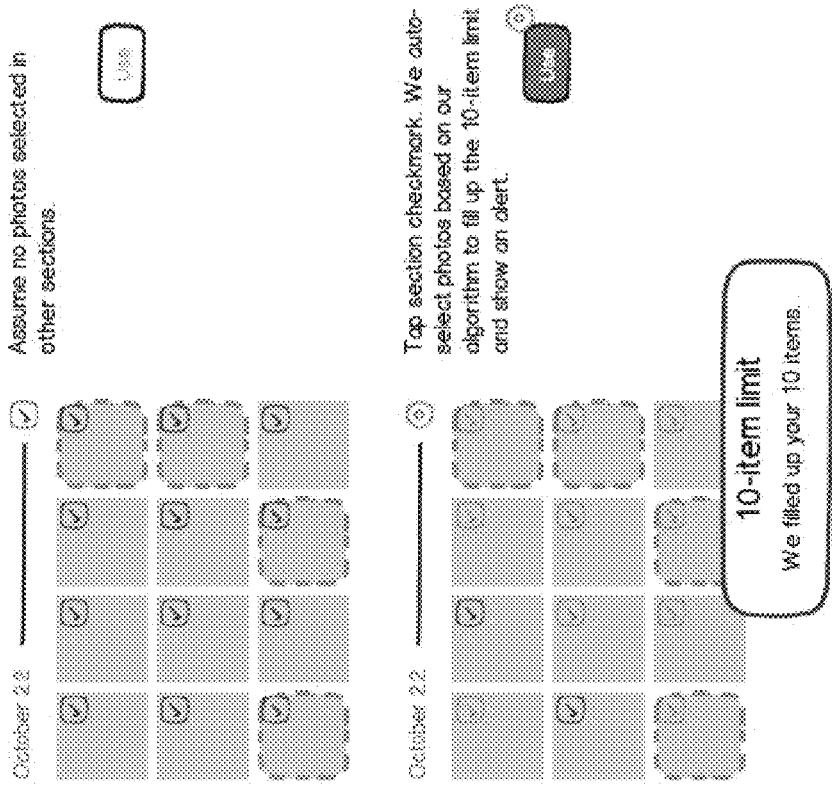
FIG. 10 illustrates two (2) partial wireframe views, with legends and notes, for one example embodiment of a graphical user interface with example state indications relating to selection and enforcement of limits on selection of media items in large sections.

FIG. 10 illustrates two (2) partial wireframe views, with legends and notes, for one example embodiment of a graphical user interface with example state indications relating to selection and enforcement of limits on selection of media items in large sections. In an embodiment, a limit value and associated program logic may enforce a limit on the maximum number of media items that can be selected. In other embodiments, limit values are not used.

Figure 11:
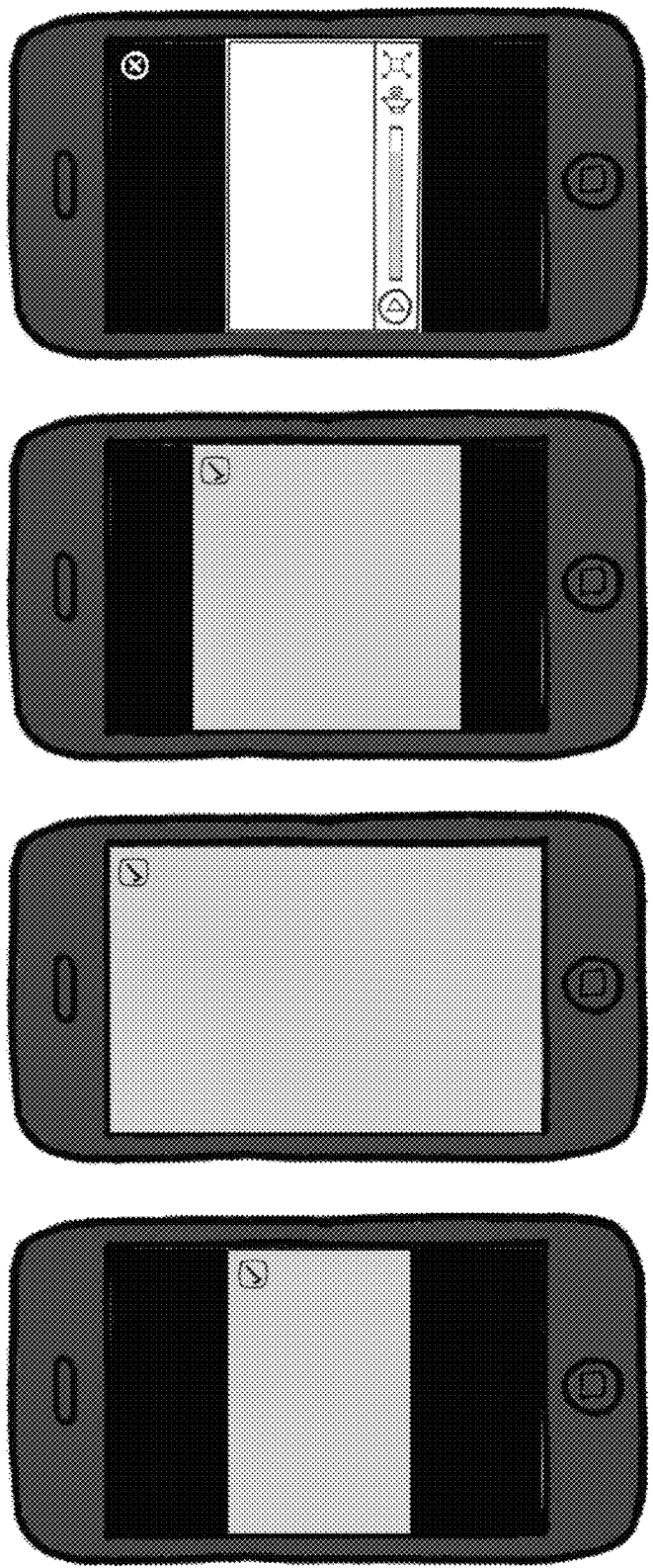
FIG. 11 illustrates four (4) wireframe views, with legends and notes, for various example embodiments of a graphical user interface in which media items are displayed in zoomed or enlarged form, and in which a video is depicted.

FIG. 11 illustrates four (4) wireframe views, with legends and notes, for various example embodiments of a graphical user interface in which media items are displayed in zoomed or enlarged form, and in which a video is depicted.

Figure 12:
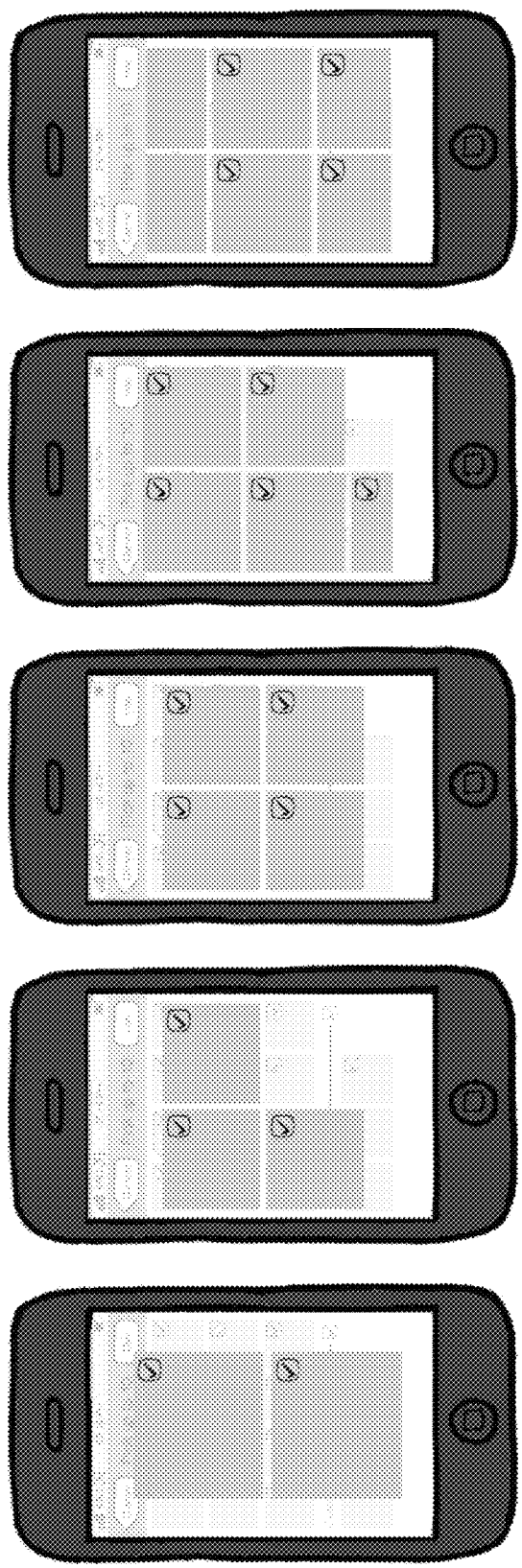
FIG. 12 illustrates five (5) wireframe views, with legends and notes, for various example embodiments of a graphical user interface in which the individual media items within a stack are displayed.

FIG. 12 illustrates five (5) wireframe views, with legends and notes, for various example embodiments of a graphical user interface in which the individual media items within a stack are displayed. Various embodiments in FIG. 12 indicate example arrangements of a GUI showing media items in stacks comprising one, two, three, four, and more than four media items.

Figure 13:
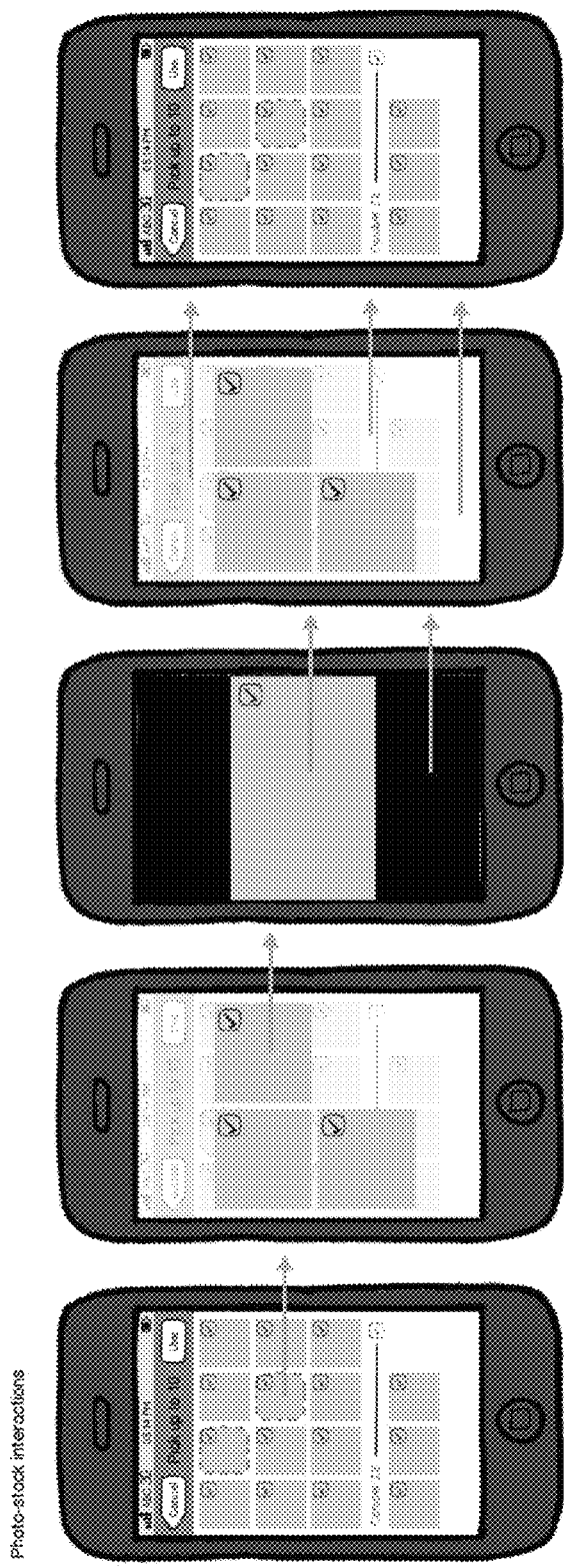
FIG. 13 illustrates five (5) wireframe views, with legends and notes, for an example embodiment of a graphical user interface.

FIG. 13 illustrates five (5) wireframe views, with legends and notes, for an example embodiment of a graphical user interface. The views of FIG. 13 depict an example of successive GUI displays during actions comprising:

1. showing multiple sections, each section having multiple media items and stacks, and selecting a particular stack of media items in one of the sections;

2. displaying all three (3) media items in the example stack that was selected;

3. receiving a selection of one individual media item among the media items in the stack and display that selected media item in zoomed format;

4. receiving a selection outside the zoomed selected media item and returning to the previous display of the three (3) media items of the example selected stack;

5. receiving a selection outside the three (3) media items of the example selected stack and returning, in response, to the first display showing multiple sections, each section having multiple media items and stacks, and selecting a particular stack of media items in one of the sections.

Thus, FIG. 13 represents the GUI displays that could be shown on a single mobile computing device during one hypothetical session, or set of interactions. Other embodiments and/or other sessions could result in a different series of displays.

2. Example Implementation Platform—Hardware Overview

Figure 14:
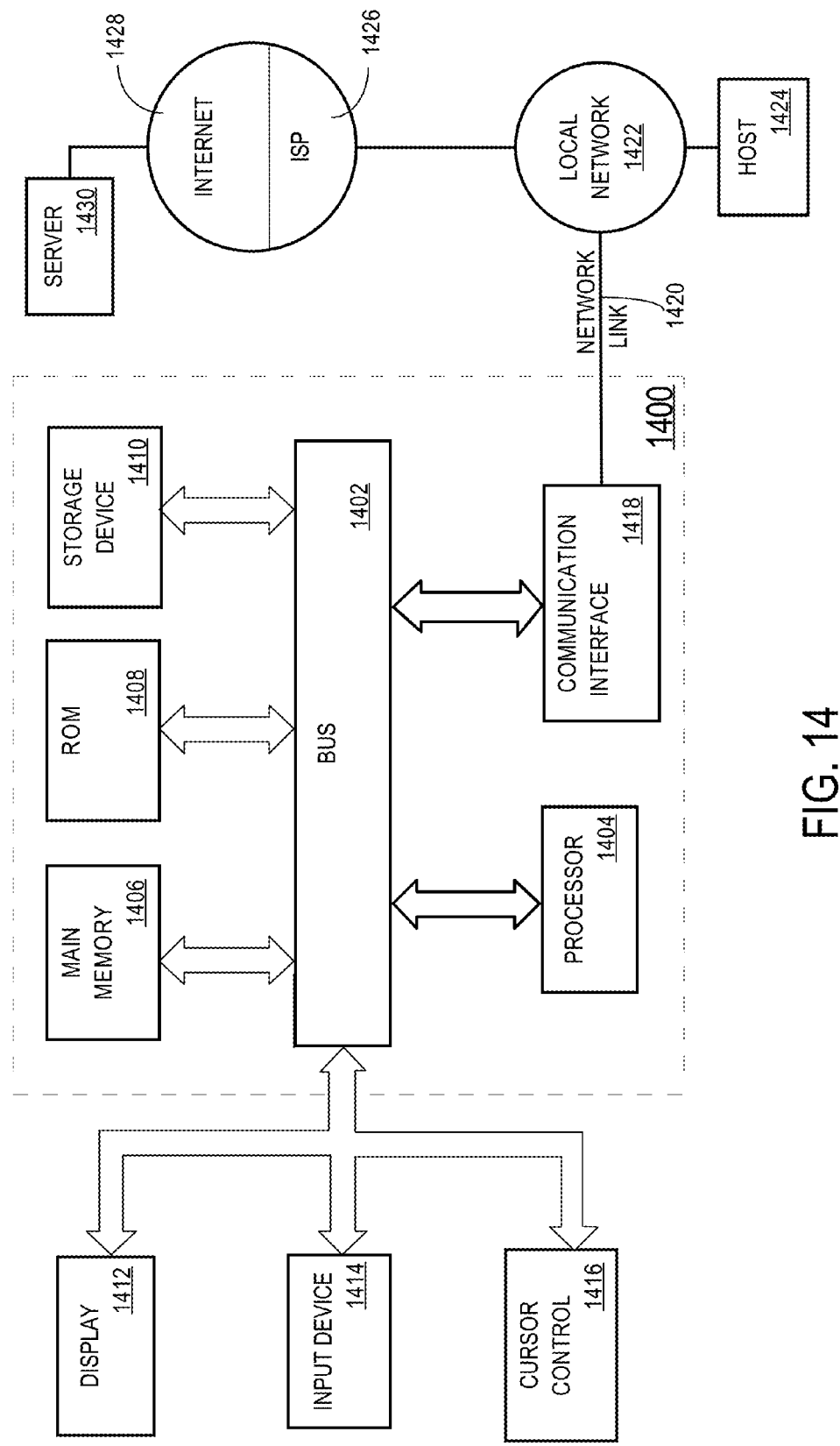
FIG. 14 is a block diagram that illustrates a computer system upon which an embodiment may be implemented.

FIG. 14 is a block diagram that illustrates a computer system 1400 upon which an embodiment of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for implementing the techniques described herein. According to one embodiment of the invention, those techniques are performed by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1400, various machine-readable media are involved, for example, in providing instructions to processor 1404 for execution. Such a medium may take many forms, including but not limited to storage media and transmission media. Storage media includes both non-volatile media and volatile media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In this manner, computer system 1400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

obtaining timestamp information for a plurality of media items;

assigning each media item of the plurality of media items to one of a plurality of media item groups based at least in part on the timestamp information, each media item group of the plurality of media item groups having at least one media item of the plurality of media items assigned to it, the plurality of media item groups comprising a current media item group and a previous media item group, the current media item group representing a first period of time, the previous media item group representing a second period of time that is earlier than the first period of time;

determining a number of media items assigned to the previous media item group;

determining a number of media items assigned to the current media item group of the plurality of media item groups;

performing a comparison between the number of media items assigned to the current media item group and a threshold number of media items;

based at least on a) the comparison, b) the number of media items assigned to the previous media item group, and c) the length of the second period of time, determining to compound the current media item group with the previous media item group of the plurality of media item groups thereby forming a compound group comprising the one or more media items assigned to the current media item group and the one or more media items assigned to the previous media item group, the compound group representing a third period of time comprising the first period of time and the second period of time;
wherein the previous media item group is formed by compounding at least two of the plurality of media item groups to form the previous media item group;
displaying on a video display an indication that the compound group represents the third period of time; and
wherein the method is performed by a computing device.

2. The method of claim 1, wherein at least one of the media items is a digital image, a digital photo, a digital video, or a digital audio file.

3. The method of claim 1, wherein length of the second period of time is greater than the length of the first period of time.

4. The method of claim 3, wherein the length of the first period of time is or is approximately one day and the length of the second period of time is or is approximately multiple days.

5. The method of claim 1, wherein the comparison is a first comparison; and wherein the method further comprises:
determining a number of media items assigned to the previous media item group;
performing a second comparison between the number of media items assigned to the previous media item group and the threshold number of media items; and
determining to compound the current media item group with the previous media item group based at least in part on the second comparison.

6. The method of claim 1, further comprising:
obtaining geographic location information for the plurality of media items; and
assigning each media item of the plurality of media items to one of a plurality of media item groups based at least in part on the geographic location information.

7. The method of claim 1, further comprising:
obtaining digital compass heading information for the plurality of media items; and
assigning each media item of the plurality of media items to one of a plurality of media item groups based at least in part on the digital compass heading information.

8. The method of claim 1, wherein the compound group comprises a stack; wherein the stack of the compound group comprises a plurality of media items, of the plurality of media items of the compound group; and wherein the method further comprises displaying, on the video display, in association with the indication that the compound group represents the third period of time, a representation of the stack of the compound group.

9. The method of claim 8, further comprising:
assigning a particular media item, of the plurality of media items of the compound group, to the stack of the compound group based at least in part on a comparison between a digital compass heading value associated with the particular media item and a digital compass heading value associated with another media item, of the plurality of media items of the compound group, assigned to the stack of the compound group.

10. One or more non-transitory computer readable media storing instructions which, when executed by one or more processors, cause performance of a method comprising:
obtaining timestamp information for a plurality of media items;
assigning each media item of the plurality of media items to one of a plurality of media item groups based at least in part on the timestamp information, each media item group of the plurality of media item groups having at least one media item of the plurality of media items assigned to it, the plurality of media item groups comprising a current media item group and a previous media item group, the current media item group representing a first period of time, the previous media item group representing a second period of time that is earlier than the first period of time;
determining a number of media items assigned to the previous media item group;
determining a number of media items assigned to the current media item group of the plurality of media item groups;
performing a comparison between the number of media items assigned to the current media item group and a threshold number of media items;
based at least on a) the comparison, b) the number of media items assigned to the previous media item group, and c) the length of the second period of time, determining to compound the current media item group with the previous media item group of the plurality of media item groups thereby forming a compound group comprising the one or more media items assigned to the current media item group and the one or more media items assigned to the previous media item group, the compound group representing a third period of time comprising the first period of time and the second period of time;
wherein the previous media item group is formed by compounding at least two of the plurality of media item groups to form the previous media item group; and
displaying on a video display an indication that the compound group represents the third period of time.

11. The one or more non-transitory computer-readable media of claim 10, wherein at least one of the media items is a digital image, a digital photo, a digital video, or a digital audio file.

12. The one or more non-transitory computer-readable media of claim 10, wherein length of the second period of time is greater than the length of the first period of time.

13. The one or more non-transitory computer-readable media of claim 12, wherein the length of the first period of time is or is approximately one day and the length of the second period of time is or is approximately multiple days.

14. The one or more non-transitory computer-readable media of claim 10, wherein the comparison is a first comparison; and wherein the method further comprises:
determining a number of media items assigned to the previous media item group;
performing a second comparison between the number of media items assigned to the previous media item group and the threshold number of media items; and
determining to compound the current media item group with the previous media item group based at least in part on the second comparison.

15. The one or more non-transitory computer-readable media of claim 10, the method further comprising:
obtaining geographic location information for the plurality of media items; and
assigning each media item of the plurality of media items to one of a plurality of media item groups based at least in part on the geographic location information.

16. The one or more non-transitory computer-readable media of claim 10, the method further comprising:
obtaining digital compass heading information for the plurality of media items; and assigning each media item of the plurality of media items to one of a plurality of media item groups based at least in part on the digital compass heading information.

17. The one or more non-transitory computer-readable media of claim 10, wherein the compound group comprises a plurality of media items; and wherein the method further comprises:
    assigning each media item, of the plurality of media items of the compound group, to a stack, of a plurality of stacks, of the compound group; and
    displaying, on the video display, in association with the indication that the compound group represents the third period of time, a representation of each stack, of the plurality of stacks, of the compound group.

18. The one or more non-transitory computer-readable media of claim 17, wherein assigning a particular media item, of the plurality of media items of the compound group, to a stack, of the plurality of stacks of the compound group, is based at least in part on a comparison between a digital compass heading value associated with the particular media item and a digital compass heading value associated with a media item assigned to a stack, of the plurality of stacks, of the compound group.

19. A method comprising:
    obtaining a digital compass heading value for each of a plurality of media items;
    obtaining timestamp information for the plurality of media items;
    assigning each media item of the plurality of media items to one of a plurality of media item groups based at least in part on the timestamp information, each media item group of the plurality of media item groups having at least one media item of the plurality of media items assigned to it, the plurality of media item groups comprising a current media item group and a previous media item group, the current media item group representing a first period of time, the previous media item group representing a second period of time that is earlier than the first period of time;
    wherein the step of assigning comprises assigning at least two media items of the plurality of media items to the same group of media items based at least in part on the digital compass heading value for a first media item of the at least two media items being within a threshold compass heading value amount of the digital compass heading value for a second media item of the at least two media items;
    determining a number of media items assigned to the current media item group of the plurality of media item groups;
    performing a comparison between the number of media items assigned to the current media item group and a threshold number of media items;
    based at least on the comparison, determining to compound the current media item group with the previous media item group of the plurality of media item groups thereby forming a compound group comprising the one or more media items assigned to the current media item group and the one or more media items assigned to the previous media item group, the compound group representing a third period of time comprising the first period of time and the second period of time;
    displaying on a video display an indication that the compound group represents the third period of time;
    displaying on a video display an indication that the first media item and the second media item are assigned to the same group of media items; and
    wherein the method is performed by one or more computing devices.

20. The method of claim 19, wherein obtaining the digital compass heading values comprises extracting the digital compass heading values from data associated with the plurality of media items.

21. The method of claim 19, wherein obtaining the digital compass heading values comprises extracting the digital compass heading values from Exchange image file format (Exif) data associated with the plurality of media items.

22. The method of claim 19, further comprising assigning the at least two media items of the plurality of media items to the same group of media items based at least in part on the digital compass heading value for the first media item being within a threshold angular value in orientation of the digital compass heading value for the second media item.

23. One or more non-transitory computer-readable media storing instructions which, when executed by one or more processors, cause performance of a method comprising:
    obtaining a digital compass heading value for each of a plurality of media items;
    obtaining timestamp information for the plurality of media items;
    assigning each media item of the plurality of media items to one of a plurality of media item groups based at least in part on the timestamp information, each media item group of the plurality of media item groups having at least one media item of the plurality of media items assigned to it, the plurality of media item groups comprising a current media item group and a previous media item group, the current media item group representing a first period of time, the previous media item group representing a second period of time that is earlier than the first period of time;
    wherein the step of assigning comprises assigning at least two media items of the plurality of media items to the same group of media items based at least in part on the digital compass heading value for a first media item of the at least two media items being within a threshold compass heading value amount of the digital compass heading value for a second media item of the at least two media items;
    determining a number of media items assigned to the current media item group of the plurality of media item groups;
    performing a comparison between the number of media items assigned to the current media item group and a threshold number of media items;
    based at least on the comparison, determining to compound the current media item group with the previous media item group of the plurality of media item groups thereby forming a compound group comprising the one or more media items assigned to the current media item group and the one or more media items assigned to the previous media item group, the compound group representing a third period of time comprising the first period of time and the second period of time;
    displaying on a video display an indication that the compound group represents the third period of time; and
    displaying on a video display an indication that the first media item and the second media item are assigned to the same group of media items.

24. The one or more non-transitory computer-readable media of claim 23, wherein obtaining the digital compass heading values comprising extracting the digital compass heading values from data associated with the plurality of media items.

25. The one or more non-transitory computer-readable media of claim 23, wherein obtaining the digital compass heading values comprising extracting the digital compass heading values from Exchange image file format (Exif) data associated with the plurality of media items.

26. The one or more non-transitory computer-readable media of claim 23, the method further comprising assigning the at least two media items of the plurality of media items to the same group of media items based at least in part on the digital compass heading value for the first media item being within a threshold angular value in orientation of the digital compass heading value for the second media item.

27. The one or more non-transitory computer-readable media of claim 26, wherein the threshold angular value in orientation is or is approximately 45 degrees.

* * * * *